US007014454B2

(12) United States Patent
Eichlseder

(10) Patent No.: US 7,014,454 B2
(45) Date of Patent: Mar. 21, 2006

(54) METERING DEVICE FOR AN INJECTION MOLDING UNIT

(75) Inventor: Martin Eichlseder, Tettenweis (DE)

(73) Assignee: Krauss-Maffei Kunststofftechnik GmbH, München (DE)

( * ) Notice: Subject to any disclaimer, the term of this patent is extended or adjusted under 35 U.S.C. 154(b) by 0 days.

(21) Appl. No.: 10/984,078

(22) Filed: Nov. 9, 2004

(65) Prior Publication Data

US 2005/0053692 A1 Mar. 10, 2005

Related U.S. Application Data

(63) Continuation of application No. PCT/EP03/04687, filed on May 6, 2003.

(30) Foreign Application Priority Data

May 15, 2002 (DE) ................................ 102 21 535

(51) Int. Cl.
*B29C 45/20* (2006.01)

(52) U.S. Cl. ...................... 425/557; 425/560; 425/561; 425/562; 425/564

(58) Field of Classification Search ................ 425/562, 425/563, 564, 566, 565, 557, 558, 559, 560, 425/561
See application file for complete search history.

(56) References Cited

U.S. PATENT DOCUMENTS

| | | | | |
|---|---|---|---|---|
| 3,160,331 | A | | 12/1964 | Trumbull et al. |
| 3,390,433 | A | | 7/1968 | Barnett et al. |
| 3,841,813 | A | * | 10/1974 | Stanciu ....................... 425/563 |

FOREIGN PATENT DOCUMENTS

| | | |
|---|---|---|
| CH | 461 789 A | 8/1968 |
| DE | 1 849 055 | 3/1962 |
| FR | 1 428 521 | 11/1964 |

* cited by examiner

*Primary Examiner*—Tim Heitbrink
(74) *Attorney, Agent, or Firm*—Henry M. Feiereisen

(57) ABSTRACT

A metering device for an injection molding unit includes a base body having an antechamber in fluid communication with a feed channel for introduction of plastic material, and a metering chamber in fluid communication with a injection channel. The antechamber and the metering chamber are connectable with one another by a closeable passageway. Movably arranged in the base body between the antechamber and the metering chamber is a displacement member in the form of a piston to separate the antechamber and the metering chamber. The piston has a first end face which demarcates the antechamber and a second end face which demarcates the metering chamber, with the first end face defining an effective area which is smaller than an effective area of the second end face.

11 Claims, 2 Drawing Sheets

METERING DEVICE FOR AN INJECTION MOLDING UNIT

CROSS-REFERENCES TO RELATED APPLICATIONS

This application is a continuation of prior filed PCT International application no. PCT/EP03/04687, filed May 6, 2003, which designated the United States and on which priority is claimed under 35 U.S.C. §120, the disclosure of which is hereby incorporated by reference, and which claims the priority of German Patent Application, Serial No. 102 21 535.9, filed May 15, 2002, pursuant to 35 U.S.C. 119(a)–(d).

BACKGROUND OF THE INVENTION

The present invention relates, in general, to a metering device for an injection molding unit.

Nothing in the following discussion of the state of the art is to be construed as an admission of prior art.

Injection molding of plastic materials requires injection of a precise amount of plastic material (shot amount) per cycle (shot) into the cavity of a molding tool, and constant reproducibility when injection of several shots is intended. This is especially true when producing data cards such as bank cards or so-called "smart cards", or also data carrier such as CDs, DVDs etc. because of the need to keep very narrow tolerances. This problem is of even greater concern in conjunction with injection compression molding with multiple cavity molds which involves injection of plastic material in a cavity that is enlarged to suit a compression stroke and subsequent compression of the plastic material. In this case, the precise shot amount must be provided in each cavity prior to the compression process because the cavities close the injection channel during compression so that a subsequent sprue removal is omitted.

Further to be taken into account is the fact that shot amounts vary as a result of thermal unbalances such as temperature control areas, different flow resistances in the hot runner manifold of different cavities as a consequence of manufacturing tolerances or other imprecision in the system. As the injection process in connection with injection screws is impacted by mechanical properties of non-return valves or the like, the accuracy of the shot amount is oftentimes inadequate.

It would therefore be desirable and advantageous to provide an improved metering device to obviate prior art shortcomings and to attain a precise injection amount of plastic material for each shot before carrying out the injection process.

SUMMARY OF THE INVENTION

According to one aspect of the present invention, a metering device for an injection molding unit includes a base body having an antechamber in fluid communication with a feed channel for introduction of plastic material, and a metering chamber in fluid communication with an injection channel, wherein the antechamber and the metering chamber are fluidly connectable with one another via a closeable connecting passageway, and a displacement member in the form of a piston movably arranged in the base body between the antechamber and the metering chamber to separate the antechamber and the metering chamber, wherein the displacement member has a first end face which demarcates the antechamber and a second end face which demarcates the metering chamber, with the first end face defining an effective area which is smaller than an effective area of the second end face.

In the following description, the term "connecting passageway" used to describe the connection between the antechamber and the metering chamber will be simply referred to as "passageway".

The present invention thus resolves prior art problems by connecting the metering chamber and the antechamber via the closeable connecting passageway, whereby the displacement member separates the metering chamber from the antechamber. Prior to each injection cycle, plastic material is transferred from the antechamber via the passageway into the metering chamber, with the displacement member being moved into a predetermined position which determines the precise volume of the metering chamber. Thereafter, a material flow through the passageway is cut and plasticized material is introduced via the feed channel into the antechamber. As a result, the displacement member moves to a predefined second position to thereby force a precisely predefined volume from the metering chamber into an injection channel.

As a consequence of the mechanical construction of a metering device according to the invention, the injection volume remains constant at all times and can be trapped under pressure by imposing a holding pressure so that the injection volume is maintained under same tension and compressed from shot to shot. This in turn positively affects the shot precision.

As the antechamber-proximal end face of the displacement member is smaller than the opposite end face which demarcates the injection chamber, the movement in injection direction is realized by the injection pressure of an injection unit, whereas the movement of the displacement member in opposite direction (metering direction) is realized by the different effective areas of the end faces of the antechamber and the metering chamber of the displacement member and the imposition of a holding pressure or back pressure while the passageway is open. Both movements in opposite directions are hereby limited.

According to another feature of the present invention, opening and closing of the passageway and the injection channel may be realized by a closing assembly having a first locking member for closing the injection channel, and a second locking member for closing the passageway, whereby the closing assembly is constructed for movement between a metering position in which the injection channel is sealed off by the first locking member while the passageway is open, and an injection position in which the passageway is sealed off by the second locking member while the injection channel is open.

According to another feature of the present invention, the closing assembly may be constructed for movement into an intermediate holding pressure position in which both the passageway and the injection passageway are open.

According to another feature of the present invention, there may be provided an adjustable stop for defining an end position of the displacement member. Thus, the volume of the metering chamber can be best suited to the requirements at hand. The displacement member is movable between two end positions, whereby one end position can be defined by a shoulder of the housing, and the other end position can be defined by an end surface of a plunger.

According to another feature of the present invention, a position of the plunger relative to the displacement member is adjustable so that a volume of the metering chamber is controllable.

According to another feature of the present invention, the plunger may have a projection of reduced diameter in opposing relationship to the displacement member for demarcating the antechamber together with the first end face of the displacement member.

According to another feature of the present invention, the displacement member may have a piston rod of reduced diameter for attachment to the first end face to thereby define the effective area of the first end face.

A metering device according to the present invention ensures the manufacture of high-precision articles while maintaining very narrow article tolerances. A multiple cavity mold behaves hereby just like a single-cavity mold. In the event of a multiple cavity mold, each mold cavity is operatively connected to its own separate metering device. The metering device may be used as mold shut-off nozzle to replace a hot runner nozzle or as a machine shut-off nozzle for precise shot weight.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

The depicted embodiment is to be understood as illustrative of the invention and not as limiting in any way. It should also be understood that the drawings are not necessarily to scale. Details which are not necessary for an understanding of the present invention or which render other details difficult to perceive may have been omitted.

Figure 1:
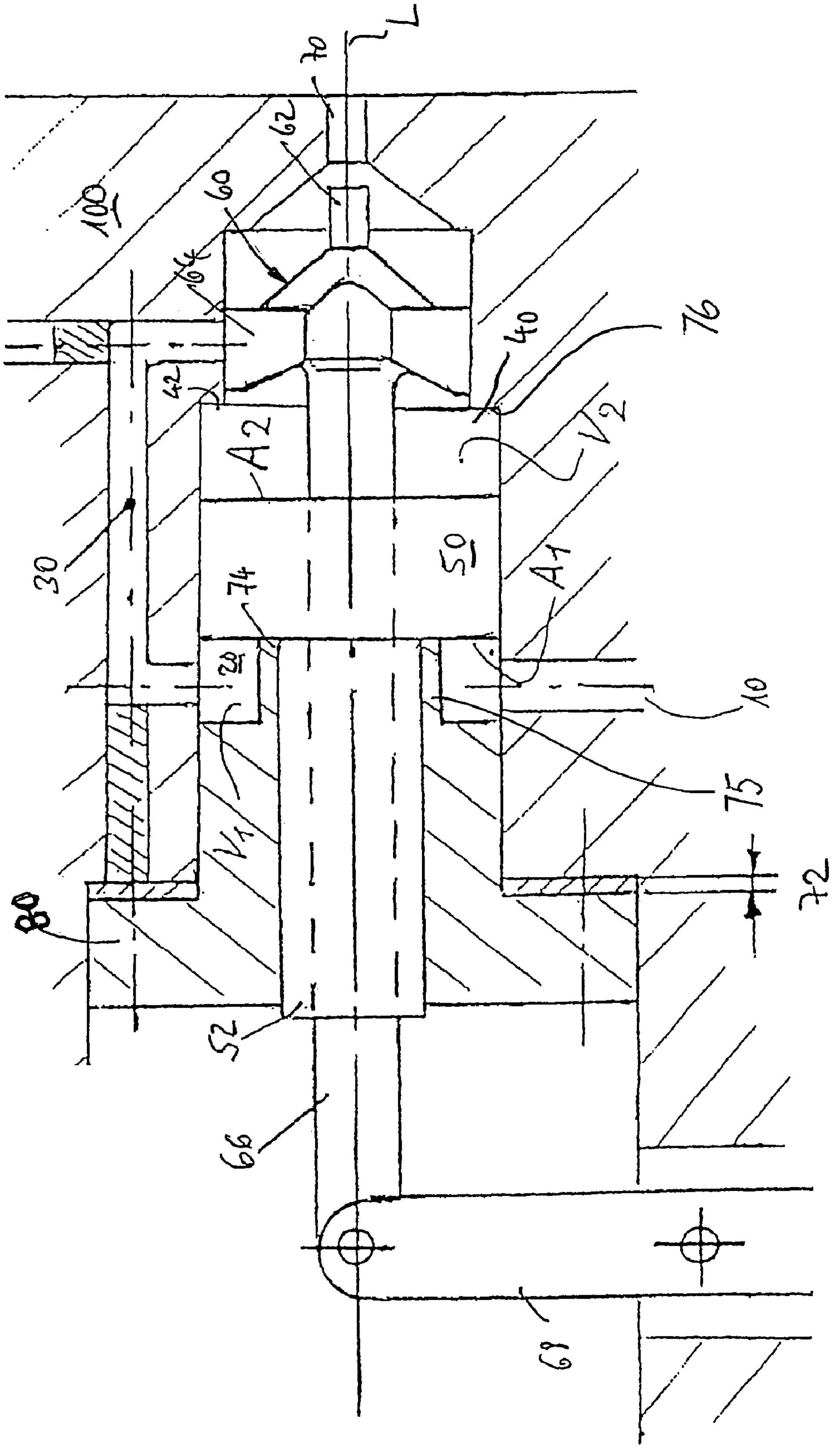
FIG. 1 shows a schematic partly sectional view of a metering device according to the present invention in one operating mode.

Turning now to FIG. 1, there is shown a schematic partly sectional view of a metering device according to the present invention including a base body 100 having formed therein a feed channel 10 which is configured as hot runner and connected to an injection molding unit (not shown), i.e. an injection screw unit or an injection cylinder. The feed channel 10 ends in a circular ring shaped antechamber 20 which in turn is connected to a metering chamber 40 via a cross-over passageway 30 which is referred hereinafter only as "passageway", as stated above. The metering chamber 40 is fluidly connected to an injection channel 70 which feeds into a mold cavity (not shown).

Placed between the antechamber 20 and the metering chamber 40 is a movable displacement element 50 in the form of a circular ring shaped piston. The displacement element 50 is movable between a first end position, when impacting a stop 74, and a second position, when impacting a second stop 42. The stop 74 is hereby formed as end surface of a projection 75 of a plunger 80 by which the metering stroke can be adjusted through adjustment of the position of the plunger in relation to the displacement member 50, as indicated by arrows 72. The projection 75 demarcates hereby the antechamber 20 in conjunction with a confronting end face of the displacement member 50. The stop 42 is defined by a shoulder 76 of the base body 100.

The metering device further includes a closing device, generally designated by reference numeral 60 and comprised of an actuator 68, and a shaft 66 operatively connected to the actuator 68 and extending along the longitudinal axis L of the metering device to the metering chamber 40 and the injection channel 70. At this end, the closing device 60 includes a closing head portion with a locking member 64 intended for closing off the passageway 30 and a blocking needle 62 intended for closing off the injection channel 70.

The antechamber-proximal end face of the displacement member 50 defines an effective area $A_1$, whereas the other end face of the displacement member 50 to demarcate the metering chamber 40 defines an effective area $A_2$, whereby the effective area $A_1$ is smaller than the effective area $A_2$. The displacement member 50 is further provided with a piston rod 52 which has in the region of the antechamber 20 a greater diameter than the shaft 66 in the region of the closing device 60. This ensures that the effective area $A_1$ is smaller than the effective area $A_2$ also in intermediate positions of the displacement member 50 between the end positions defined by the stops 42 74.

Figure 2:
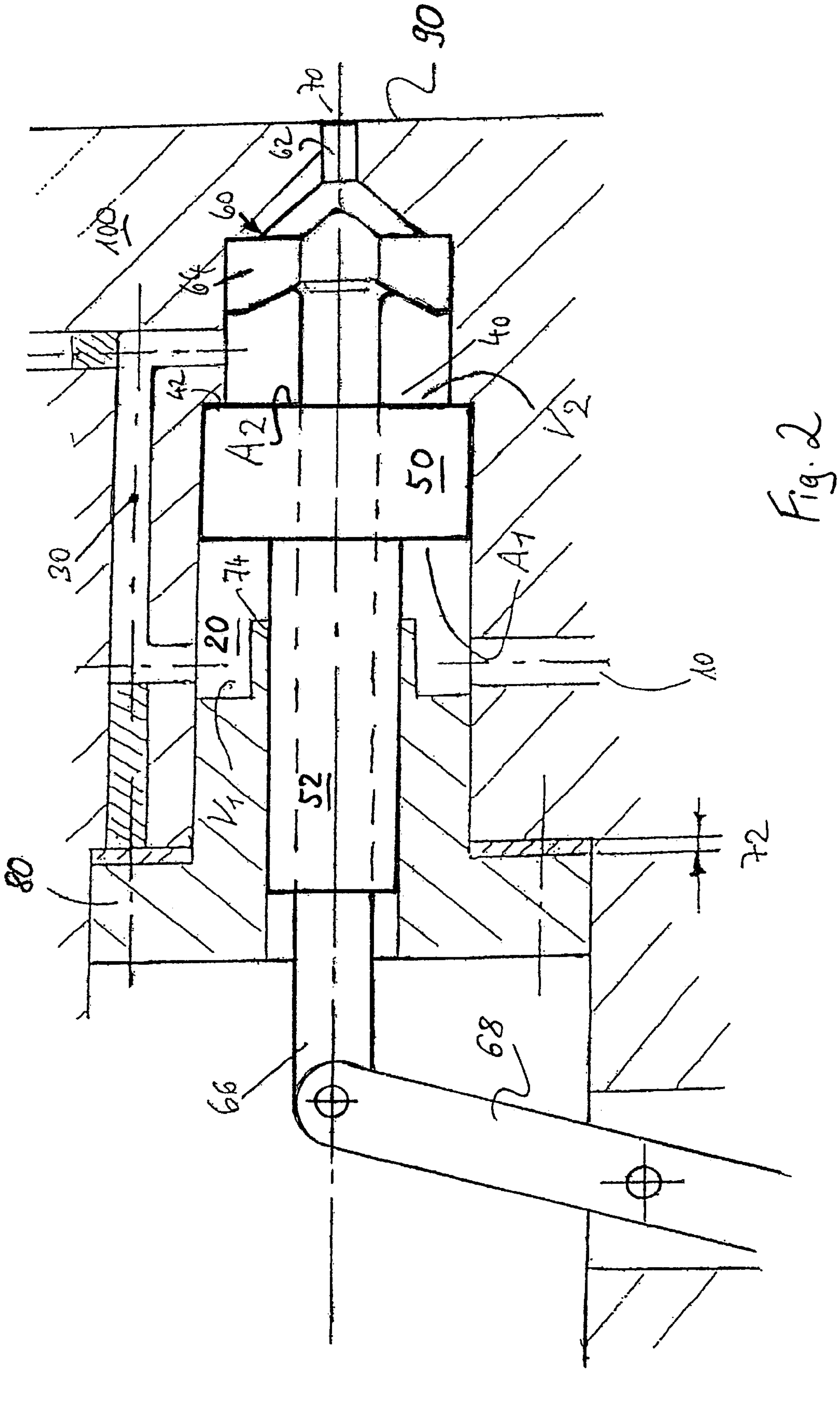
FIG. 2 shows a schematic partly sectional view of the metering device in another operating mode.

In the illustration of FIG. 1, the closing device 60 occupies the injection position in which the passageway 30 is sealed off by the locking member 64 while the injection channel 70 is open. The displacement member 50 is hereby in the left-hand end position against the stop 74, and the metering chamber 40 is fully charged with plastid material. In this situation, plastic material can be admitted from the injection molding unit via the feed channel 10. As the passageway 30 is closed, the injection pressure acts upon the smaller effective area $A_1$ and thereby forces the displacement member 50 towards the other end position against the stop 42. As a result, exactly the material volume $V_2$accumulating posteriorly of the displacement member 50 is injected into the mold cavity. Subsequently, as shown in FIG. 2. the closing device 60 is moved into the metering position, in which the blocking needle 62 closes off the injection channel 70 while shortly afterwards, the locking member 64 of the head portion clears the passageway 30. At the same time, a compression molding process may, for example, be carried out.

In the metering position shown in FIG. 2, the antechamber 20 and the metering chamber 40 communicate with one another, whereby a same pressure, holding pressure or back pressure prevails in both chambers. As a consequence of the difference between the effective areas $A_1$ and $A_2$, a resultant force is generated which causes the displacement member 50 to move to the stop 74 until the metering chamber 40 is fully re-charged. The mold (not shown) is hereby operated to carry out the compression molding process and the head portion of the closing device 60 opens, whereby initially the locking member 64 seals off the passageway 30, and the injection channel 70 is then cleared by the blocking needle 62 to start a new cycle.

The application of a metering device according to the present invention results in a gentle operation of a multiple molding tool because oversupply of the cavity is not possible as a consequence of the predefined injection amount per cavity, even when a cavity has been frozen by a multiple molding tool. Since small differences in size between the effective areas $A_1$ and $A_2$ are generally enough to attain the intended results, the displacement member 50 is subjected to slight stress and risk of leakage is low.

The metering device can be disposed in immediate proximity of the mold cavity so that the impact of mass compression between the metering device and the mold cavity is insignificant, and the use of a metering device according to the present invention is possible, without any need for extensive modification of injection molding machines. Thus, the operating sequence is identical to a mold closing nozzle.

In general, it is also conceivable to cut the passageway 30 separate from the head portion of the closing device so as to allow optional use of the passageway for generating a holding pressure. As the injection amount is established by the metering device, the need for non-return valves during plasticization may, in most cases, be omitted in injection screws so that accompanying problems such as wear, fluctuations of the shot weight and the like are eliminated.

In general, the shot weight per cavity is set by the adjustment plunger 80 so that greatly varying injection amounts can be adjusted.

When the metering device is used in the mold as shut-off nozzle, there is a need for only a one-time shot weight adjustment per cavity as the weight of the article is governed by the mold cavity.

It is furthermore possible to plasticize with an injection screw or an injection cylinder a great metering stroke which is applicable for several cycles.

When using the metering device in the molding tool as shut-off nozzle, a high injection pressure may be applied on the side of the antechamber 20 prior to opening of the shut-off nozzle. When the shut-off nozzle is then opened, the injection process takes place abruptly as the imposed injection pressure acts like a storage. Thus, resistance losses from the feed channel to the metering device are eliminated, when the injection process begins. The sudden injection leads to very short injection times. In addition, the sudden injection results also in an improved process.

As stated above, a metering device according to the present invention is applicable in particular for molds with several cavities. Such molds have an injection channel in which the plastizing unit inject material and which branches out into several injection channels, whereby each branched injection channel feeds into a mold cavity. Suitably, each branched injection channel is provided with a metering device downstream of the branching location so that each mold cavity has its own metering device. The metering device is hereby preferably disposed in proximity of the mold cavity so that the injection channel 70 feeds into the mold cavity.

In molds with only one cavity, the metering device can advantageously be disposed also in proximity of the cavity. Of course, it is also possible to arrange the metering device at any desired location between the plasticizing unit and the mold cavity.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A metering device for an injection molding unit, comprising:

a base body having an antechamber in fluid communication with a feed channel for introduction of plastic material, and a metering chamber in fluid communication with an injection channel, the antechamber and the metering chamber being connectable with one another by a closeable passageway; and a displacement member in the form of a piston movably arranged in the base body between the antechamber and the metering chamber to separate the antechamber and the metering chamber, said displacement member having a first end face which demarcates the antechamber and a second end face which demarcates the metering chamber, with the first end face defining an effective area which is smaller than an effective area of the second end face.

2. The metering device of claim 1, and further comprising a closing assembly having a first locking member for closing the injection channel, and a second locking member for closing the passageway, said closing assembly being constructed for movement between a metering position in which the injection channel is closed off by the first locking member while the passageway is open, and an injection position in which the passageway is closed off by the second locking member while the injection channel is open.

3. The metering device of claim 2, wherein the closing assembly is constructed for movement into a holding pressure position in which the passageway and the injection channel are open.

4. The metering device of claim 1, and further comprising an adjustable stop for defining an end position of the displacement member.

5. The metering device of claim 1, wherein the displacement member is movable between two end positions, one end position being defined by a shoulder of the housing, and the other end position being defined by an end surface of a plunger.

6. The metering device of claim 5, wherein a position of the plunger relative to the displacement member is adjustable so that a volume of the metering chamber is controllable.

7. The metering device of claim 5, wherein the plunger has a projection of reduced diameter in opposing relationship to the displacement member for demarcating the antechamber together with the first end face.

8. The metering device of claim 1, wherein the displacement member has a piston rod of reduced diameter to define the first end face.

9. An injection molding unit, comprising a metering device including a base body having an antechamber in fluid communication with a feed channel for introduction of plastic material, and a metering chamber in fluid communication with an injection channel, wherein the antechamber and the metering chamber are fluidly connectable with one another via a closeable connecting passageway, and a displacement member in the form of a piston movably arranged in the base body between the antechamber and the metering chamber to separate the antechamber and the metering chamber, wherein the displacement member has a first end face which demarcates the antechamber and a second end face which demarcates the metering chamber, with the first end face defining an effective area which is smaller than an effective area of the second end face.

10. A molding tool for making a plastic article, comprising a metering device including a base body having an antechamber in fluid communication with a feed channel for introduction of plastic material, and a metering chamber in fluid communication with an injection channel, wherein the antechamber and the metering chamber are fluidly connectable with one another via a closeable connecting passageway, and a displacement member in the form of a piston movably arranged in the base body between the antechamber and the metering chamber to separate the antechamber and the metering chamber, wherein the displacement member has a first end face which demarcates the antechamber and a second end face which demarcates the metering chamber, with the first end face defining an effective area which is smaller than an effective area of the second end face.

11. The molding tool of claim 10 having several mold cavities and several of said metering device, said mold cavities and said metering devices being placed in one-to-one correspondence.

* * * * *